(No Model.) 2 Sheets—Sheet 1.

N. H. NEWTON.
COMBINED PLOW, CHOPPER, AND PLANTER.

No. 534,122. Patented Feb. 12, 1895.

WITNESSES:
Chas. Nida.
C. Sedgwick

INVENTOR
N. H. Newton
BY
Munn & Co
ATTORNEYS.

(No Model.) 2 Sheets—Sheet 2.
N. H. NEWTON.
COMBINED PLOW, CHOPPER, AND PLANTER.
No. 534,122. Patented Feb. 12, 1895.
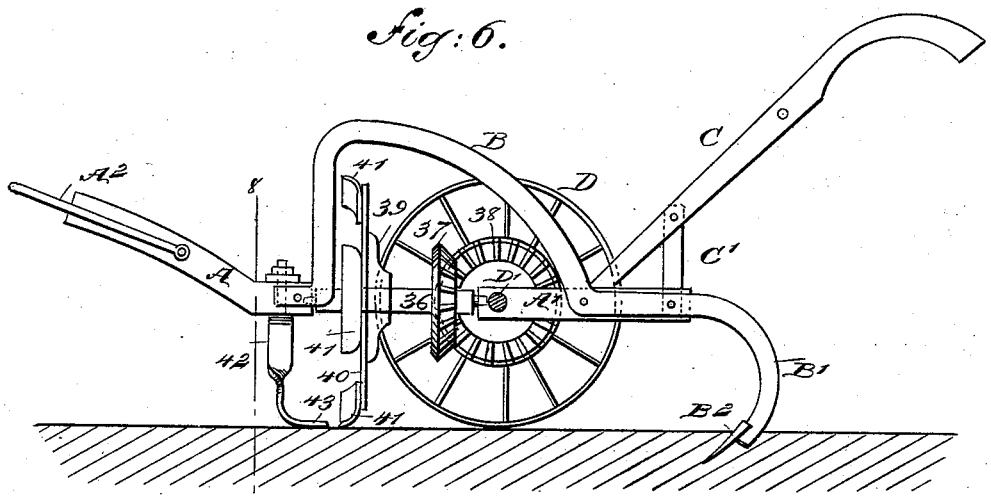
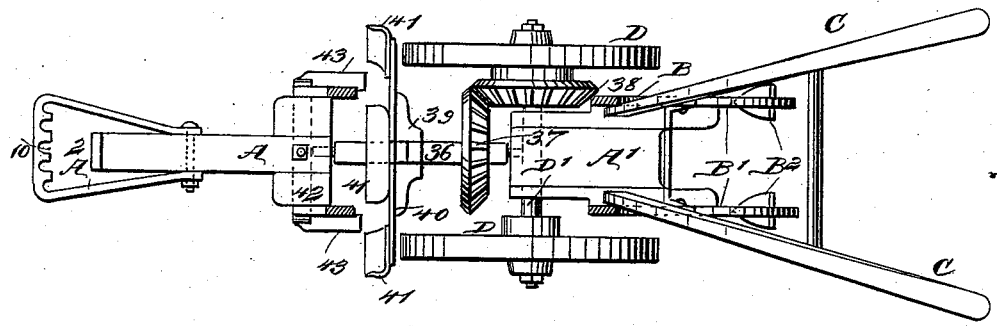
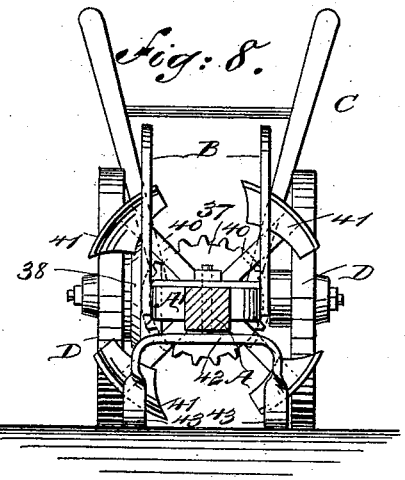
WITNESSES:
Chas. Nida.
C. Sedgwick
INVENTOR
N. H. Newton
BY
Munn & Co.
ATTORNEYS.

UNITED STATES PATENT OFFICE.

NICHOLAS H. NEWTON, OF RUSK, TEXAS.

COMBINED PLOW, CHOPPER, AND PLANTER.

SPECIFICATION forming part of Letters Patent No. 534,122, dated February 12, 1895.

Application filed April 5, 1894. Serial No. 506,480. (No model.)

*To all whom it may concern:*

Be it known that I, NICHOLAS H. NEWTON, of Rusk, in the county of Cherokee and State of Texas, have invented a new and Improved Combined Plow, Chopper, and Planter, of which the following is a full, clear, and exact description.

My invention relates to an agricultural implement, and it has for its object to provide a machine which will open the land, plant and fertilize at the same time, and which may be quickly adjusted for chopping cotton plants and at the same time cultivate rows of plants.

A further object of the invention is to provide a machine of this character which will be exceedingly simple, durable and economic in its construction, the various parts being capable of attachment to a common frame in an expeditious and convenient manner.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1:
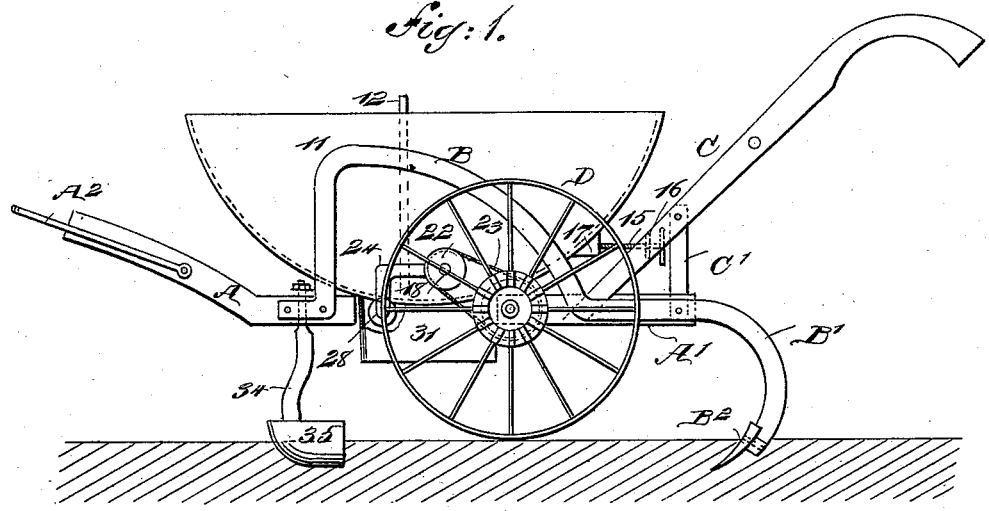
Figure 2:
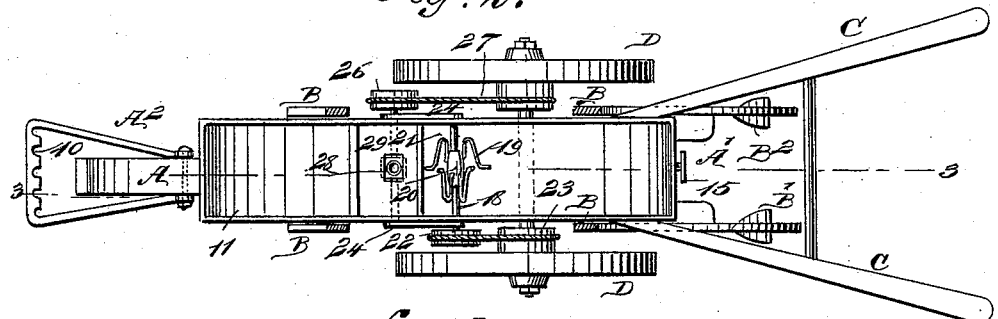
Figures 3, 5:
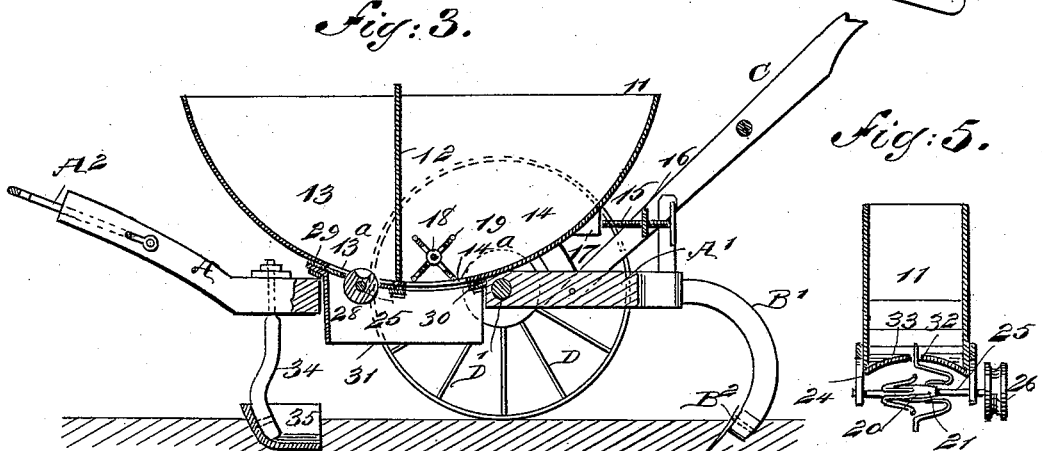
Figure 4:
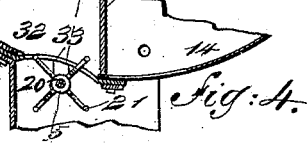

Figure 1 is a side elevation of the machine constructed for seeding, distributing fertilizer and covering the seed. Fig. 2 is a plan view of the machine as shown in Fig. 1. Fig. 3 is a longitudinal vertical section through the machine, taken practically on the line 3—3 of Fig. 2. Fig. 4 is a partial sectional view of the seed and fertilizing chambers of the machine, illustrating the dropping mechanism as constructed for the planting of cotton seed. Fig. 5 is a vertical section through the seed compartment, illustrating the dropping mechanism applied thereto for use in connection with cotton seed. Fig. 6 is a side elevation of the machine constructed for chopping and cultivating cotton plants. Fig. 7 is a plan view of the machine illustrated in Fig. 6; and Fig. 8 is a partial front elevation and partial vertical section of the machine, the section being taken practically on the line 8—8 of Fig. 6.

In carrying out the invention, the frame of the machine in every instance consists of a beam constructed in two sections A and A', which sections are separated a predetermined distance and are connected by side irons or arms B, which arms are preferably secured one to each side of the rear portion of the forward section A of the main beam, and are then carried vertically upward and arched downwardly and rearwardly to a connection with the rear portion of the rear beam section A', and the rear parts of the irons or side connecting bars B follow the sides of the rear beam section A' and are curved downwardly and forwardly from the rear of the said rear beam sections, forming shanks B', to which plow blades B² of any approved construction are attached, preferably in an adjustable manner.

The forward beam section A at its forward end is upwardly curved or inclined, and is provided with a clevis A², pivotally connected therewith, the said clevis being made to extend beyond the forward end of the beam and it is much wider at its forward end than the corresponding portion of the beam, the clevis being provided at its forward end with series of notches or recesses 10, whereby the team may be made to draw in alignment with the beam, or at the right or the left side thereof. The construction of the frame is substantially completed by the addition thereto of handles C, said handles being preferably connected with the sides of the rear beam section through the medium of braces C'.

It may here be remarked that the rear section A' of the beam is preferably much wider than the forward section, the forward section being located opposite the center of the rear section, as is clearly illustrated in Fig. 7.

The frame is supported by two wheels D, which wheels are secured upon the ends of an axle D', mounted to turn in the forward portion of the rear beam section, but either of the wheels may be readily removed from the axle.

In fitting up the frame for the purpose of planting seed and distributing fertilizer, a box 11 is mounted upon the two beam sections in a manner to cross the space between them. This box may be of any desired shape, but is preferably made semi-circular or practically so in general contour, the straight surface being the upper surface. The box 11 is divided by a partition 12 into two compartments 13 and 14, the compartment 14, for example, being adapted to contain fertilizer, while the compartment 13 is adapted to contain seed to be planted. Each of the said compartments 13 and 14 is provided with an opening in its bottom the opening in the compartment 13 being designated as 13$^a$, and that in the compartment 14 as 14$^a$, and these openings are located one at each side of the partition 12, and in such manner that they are brought within the space between the beam sections, as illustrated in Fig. 3. The box is given an adjustment in a forward direction when necessary, through the medium of an adjusting screw 15, held to turn in a cross bar 16, carried for example from handle to handle, the said screw having bearing against an offset 17, located upon the rear of the box.

A shaft 18 is journaled in the fertilizer compartment 14 of the box over its opening 14$^a$, and the said shaft carries a distributer 19, which distributer consists of a hub 20, and a series of arms 21, which arms are attached to the hub at each end, the arms being bent upon themselves in direction of and over the central portion of the hub, their inner ends being outwardly inclined, and the arms 21 of one series, or those at one end of the hub lie closer to the hub than the opposite arms, which virtually overlap the closer ones, as is shown in both Figs. 2 and 5; and the free ends of the outer set or arms are preferably made longer than those of the inner set, since the said outwardly extending ends of the wider arms are made to pass down and extend through the opening 14$^a$ in the box, and the said opening may, if in practice it is found desirable, be in the nature of a slot, and preferably is so formed, whereby, as the shaft 18 is revolved the distributer 19 will pulverize the fertilizing material and force it downward through the opening 14$^a$ in proper quantities, and in sheet form, whereby it will be distributed properly in the furrow. The shaft 18 is preferably provided at its left-hand end with a pulley 22, the said pulley being connected by a belt 23 with the hub of the left-hand wheel D as shown in Fig. 2, the said hub being of cylindrical formation.

Brackets 24, are usually projected downward at each side of the box, said brackets preferably extending from the point of the box through which the shaft 18 passes, forwardly and then downwardly beyond the lower edge of the box thus bracing the sides as shown in Fig. 1. These brackets at their lower ends serve to journals beneath the box and likewise beneath the opening 13$^a$ in the seed compartment a shaft 25, which shaft is provided at its right-hand end with a pulley 26, driven by a belt 27 connected with the hub of the right-hand supporting wheel D.

When such seed as corn is to be planted, the shaft 25 is provided with a drop cylinder 28 as shown in Fig. 3, provided with one or more peripheral buckets. This drop cylinder 28 may be readily removed from the shaft 25, being detachably connected therewith, since when cotton seed is to be planted a different character of drop is necessary.

When the cylindrical drop is used, a plate 29 is removably secured to the bottom of the box, covering a portion of the opening 13$^a$, being provided with an opening only sufficiently large to permit the cylindrical dropper to extend upwardly within the said seed compartment as shown in Fig. 3, and a second plate 30 may be located over the opening 14$^a$ in the fertilizing chamber, in which event the opening 13$^a$ may be made quite large, and the slot heretofore referred to and through which the distributer 19 projects will be made in the said plate 30. In order to prevent the wind from blowing the said fertilizer away from the machine, or away from the furrow it is intended to enter, a shield 31 is attached to the bottom of the box, and virtually takes up the space between the beam sections, as illustrated in Figs. 1 and 3, and serves as an effective guard. The adjusting device 15 is brought into action preferably to carry the box forwardly and thus tighten the driving belts 23 and 27.

When cotton seed is to be planted the distributer employed is correspondingly constructed to the distributer heretofore described and located in the fertilizer chamber, the said distributer being shown in detail in Figs. 4 and 5, in which it will be observed that the free ends of the wider arms will extend upward through the slot 32 produced in plate 33 substituted for the plate 29, and draw the said cotton seed downward in proper quantities.

When the machine is used as a planter, a shank 34 is attached to the rear portion of the forward beam section A, being made to extend downwardly therefrom, and a furrow opener 35 is secured to the lower end of its shank. The furrow opener is shaped substantially as a section of an elongated cup, being of greater length than width and provided with a cylindrical forward end or bottom, the sides being straight, and usually the rear end of the said furrow opener is open. By means of such a furrow opener, a smooth furrow is formed of somewhat trough shape, into which the seed and fertilizer will be evenly distributed.

It is obvious that in the construction of this machine the fertilizing material and seed will be dropped together into the furrow made to receive them, and that the shafts 18 and 25 will be revolved even in the event that one wheel only contacts with the ground, since both of the wheels will be made fast to the axle, and as the seed and fertilizing material are dropped the furrow will be covered or closed by the plows B$^2$ located at the rear of the machine frame.

When the machine is to be used for chopping out cotton plants and for cultivating the same, it is constructed as shown in Figs. 6, 7 and 8, in which the box 11 is entirely removed, and likewise the furrow opener 35 and its shank 34. In their stead a shaft 36 is journaled in the opposing ends of the beam sections A and A', the said shaft having fixed upon it a beveled gear 37, which gear is made to mesh with a similar gear 38 removably secured to the hub of one of the supporting wheels D. The shaft 36 carries likewise a chopper, and the said chopper consists of a hub 39 secured upon the shaft 36 near its forward end, spokes 40 made to radiate from the hub, and hoes 41, located one upon the outer end of each spoke. These hoes are semi-circular or segmental in cross section, and are located at a right angle to the spokes, their concaved surfaces facing forwardly, and the said hoes are made preferably wider at the end adapted to enter the ground than at the opposite end, whereby they are more or less tapering longitudinally, and the cutting edge is likewise preferably tapered more or less transversely.

In addition to the shaft 36 and its attachments, a support 42, is attached to the rear portion of the forward beam section A. This support, as shown in Fig. 8 is substantially U-shaped in general contour, is removably attached to the under face of the beam, extends beyond the sides thereof a predetermined distance, and is provided at each extremity with a rearwardly extending shoe 43. This support 42 serves to regulate the depth at which the hoes will enter the ground.

When the machine is used as a planter, the team is attached to the central portion of the clevis. When it is used for chopping purposes the team is hitched at the extreme left of the clevis, which will throw the animals off from the row and will bring the hoes immediately over the rows. Under this form of the machine, it is obvious as it is drawn forwardly the hoes will be rotated and act one after the other to remove the surplus plants from the rows, properly spacing them, and at the same time the plows B² will cultivate the rows at each side.

When the machine is used as a planter, its plows form furrows at each side of the ridge in which the seed is located, and consequently when the machine is used afterward for chopping and cultivating cotton plants, the machine, may follow in the same track as formerly, insuring the proper registry of the ridge or line of plants with the operative portions of the machine.

This machine is exceedingly simple, durable and economic in its construction, and is of great assistance to farmers in general, especially those raising cotton, since the one frame and the few additional parts will provide for the farmer two machines capable of use upon the crop at different stages of the growth.

Having thus described my invention, I claim as new and desire to secure by Letters Patent—

1. An agricultural implement, the same consisting of a frame comprising a sectional beam, the sections of which are spaced a predetermined distance apart, side bars connecting the sections of the beam, extending upwardly therefrom, forming side portions for the frame and extending downwardly and rearwardly to receive plows, an axle journaled in one of the beam sections, supporting wheels removably secured to the axle, handles attached to one section of the beam, and means, substantially as shown and described, for locating between the beam sections a seed box or chopping device, as and for the purpose specified.

2. In an agricultural implement, a frame, the same consisting of a beam constructed in sections, the said sections being separated a predetermined distance, upwardly-extending arched bars attached to the sides of the beam sections, connecting the same, plow shanks projected from the rear portions of the arched bars, adapted to have plow shares attached thereto, a seed box removably located upon the frame, provided with discharge openings over the space between the beam sections, a discharge or drop device located at the discharge openings, and a driving connection between said device and an axle of the frame, substantially as specified.

3. In an agricultural implement, the combination, with a frame constructed in separated sections, side bars upwardly arched and connecting the said beam sections, plow shanks projected downward from the rear of the rear section of the beam at the sides thereof, adapted to receive plows, and a furrow opener connected with the forward beam section, of a seed box divided into compartments, one to receive seed and the other fertilizer, said box being removably located upon the frame and provided with discharge openings in its compartments located over the space between the beam sections, a distributing device held to rotate at the discharge opening of each compartment, an axle held to revolve in the frame, supporting wheels carried by the said axle, and a driving connection between the axle and the discharge device, substantially as shown and described.

4. In an agricultural implement, the combination, with a beam constructed in separated sections, side bars upwardly arched and connecting the said beam sections, plow shanks projected downward from the rear of the rear section of the beam at the sides thereof, adapted to receive plows, and a furrow opener connected with the forward beam section, of a seed box divided into compartments, one to receive seed and the other fertilizer, the said box being removably located upon the frame and provided with discharge openings in its compartments, located over the space between the beam sections, a distributing device held to rotate at the discharge opening of each compartment, an axle held to revolve in the frame, supporting wheels carried by the said axle, a driving connection between the axle and the discharge devices, a shield located around the discharge device of the box, and means, substantially as shown and described, for adjusting the box, as and for the purpose specified.

5. In an agricultural implement of the character described, a distributer for seed or fertilizer adapted to operate in conjunction with a seed or fertilizer carrier, the said distributer consisting of a hub, arms located at the ends of the hub and inwardly projected, the arms at one end being closer to the hub than the arms at the opposing end, the inner or free ends of the arms being bent at angles to their body, as and for the purpose set forth.

NICHOLAS H. NEWTON.

Witnesses:
C. A. BALLEW,
B. C. VINING.